United States Patent
Lin et al.

(10) Patent No.: US 7,222,124 B2
(45) Date of Patent: May 22, 2007

(54) INTERNET AUTOMATIC ELECTRIC DATA SYSTEM

(75) Inventors: I-Linag Lin, Tainan (TW); Chang-Chi Lee, Kaohsiung (TW); Chih-Huang Chang, Tainan (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 487 days.

(21) Appl. No.: 10/646,696

(22) Filed: Aug. 25, 2003

(65) Prior Publication Data
US 2004/0059715 A1    Mar. 25, 2004

(30) Foreign Application Priority Data
Sep. 19, 2002    (TW) ............................... 91121520 A

(51) Int. Cl.
*G06F 7/00* (2006.01)
*G06F 17/50* (2006.01)

(52) U.S. Cl. .............. 707/100; 707/104.1; 707/101; 709/200; 716/1; 716/4

(58) Field of Classification Search ............ 716/1, 716/4; 707/100, 101, 104.1
See application file for complete search history.

(56) References Cited

U.S. PATENT DOCUMENTS

| | | | |
|---|---|---|---|
| 6,674,036 B1 * | 1/2004 | Mardi | 209/573 |
| 6,751,781 B2 * | 6/2004 | Lin et al. | 716/1 |
| 6,820,046 B1 * | 11/2004 | Lamson et al. | 703/14 |
| 2006/0010353 A1 * | 1/2006 | Haugh | 714/47 |

* cited by examiner

Primary Examiner—Sam Rimell
Assistant Examiner—Alicia Lewis
(74) Attorney, Agent, or Firm—Birch, Stewart, Kolasch & Birch, LLP

(57) ABSTRACT

The present invention discloses an Internet automatic electrical data system that comprises a process controller used to process the analyzing order for IC (integrated circuit) packages entrusted by clients. A database is used to store the input parameters of IC packages and parameters database is used to provide the condition parameters relative to the model of IC package entrusted by clients. An electrical simulation and analyzing software is introduced to analyze the parameters input by clients and the condition parameters provided by the condition parameter database. A report form generator is used to generate the report form of analyzing result and a replying means is used to send the report forms to the clients.

15 Claims, 2 Drawing Sheets

INTERNET AUTOMATIC ELECTRIC DATA SYSTEM

BACKGROUND OF THE INVENTION

This nonprovisional application claims priority under 35 U.S.C §119(a) on patent application No. 091121520 tiled in Taiwan on Sep. 19, 2002, which is herein incorporated by reference.

1. Field of the Invention

This present invention relates to an Internet automatic analyzing electrical data system, especially related to a system being able to inform the result to the clients through Internet automatically.

2. Description of the Prior Art

Because of Internet, the lifestyle has changed at an astonishing pace. It is much more convenient when we dealing with some routines. For instance, people gradually tend to write mails without pens and papers since using e-mail is much faster and cheaper than ever. There are some other specific examples about the application of Internet in daily life, such as electronic bank, electronic commerce, Internet shop, reporting one's liable taxation on Internet, and etc.

Among them the electronic commerce plays a decisive role in enterprises. Since the efficiency is highly demanded, the tolerance of consuming time is greatly reduced. The real time communication property of Internet makes itself become an important way to improve efficiency. Moreover, besides emphasizing the speediness of Internet, the enterprises are devoted to electronic inner control, and many important documents, data and messages have been stored in computers. Because these computers and severs are connected by the intranet, if the internal information can be linked to external network appropriately, companies can save a lot of money for higher commercial efficiency. Hence, no matter in electronic commerce or electronic inner control, the system integration is one of the essential targets.

By integrating the internal system of enterprises and the external Internet, electronic commerce can provide prompt and perfect service. The speed of electronic commerce is much faster than that of traditional business, so it becomes popular soon after presented to the public. For service providers, the integration of inner system resource simplifies the operation procedure and reduces the demand for human resource, and therefore saves a lot of money. Accordingly, not only the customers favor electronic commerce, but also the enterprises benefit from it, and this makes the spread of electronic commerce wider and rapider.

Moreover, in order to ensure the electronic components conforming to electrical criterion, the electrical analyzing is adopted when developing products. The value of RLC (R: resistance, L: inductance, C: capacitance) can be analyzing in early stages, and the optimization design can be obtained efficiently as well. Hence, the analysis of IC package is very important in the industry of semiconductor. However, the traditional way of entrusting analyzing wastes considerable time in the process of data transmission and personnel handling. That reduces the whole commercial benefit.

SUMMARY OF THE INVENTION

The object of this invention is to provide an entrusting system for analyzing electrical data. The IC package information can be transferred through Internet, and the analyzing can be done and the clients can be informed with the result automatically because of system automation integration.

The present invention discloses an Internet automatic electrical data system that comprises a process controller used to process the analyzing order for IC packages entrusted by clients. A working database is used to store the input parameters of IC packages and a condition parameter database is used to provide the condition parameters relative to the model of IC package entrusted by clients. An electrical simulation and analyzing software are introduced to analyze the parameters input by clients and the condition parameters provided by the condition parameter database. A report form generator is utilized to generate the report form of analyzing result and a replying means is used to send the report forms to the clients.

This invention also discloses a method for automatic analyzing electrical data through Internet which comprises following steps: clients using web browser to input the IC package parameters for analyzing, and then the IC package parameters being transferred to a working database for storing through Internet. A process controller accesses the IC package parameters from the working database and condition parameters relative to the IC package parameters from a condition parameter database. The process controller transfers the IC package parameters and the condition parameters to an electrical simulation and analyzing software for simulating and analyzing. The electrical simulation and analyzing software transfers the analyzing result to a report form generator for generating the report form of analyzing result. The report form generator transfers the report form to reply means and the reply means sends the report form to the clients.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the an from this detailed description.

DESCRIPTION OF THE PREFERRED EMBODIMENT

The present invention will become more hilly understood from the detailed description given hereinbelow and the accompanying drawings which are given by way of illustration only, and thus are not limitative of the present invention, and wherein:

The present invention discloses an Internet automatic electrical data system. It can accept the order of clients, and analyze the electrical property of input IC package parameters. All the processes are done automatically, that is, no employee is needed throughout the operation. Besides, the report form of result would be sent to the clients automatically. In this way, it can save the maximum time. The following is the illustration of the system of this invention.

Figure 1:
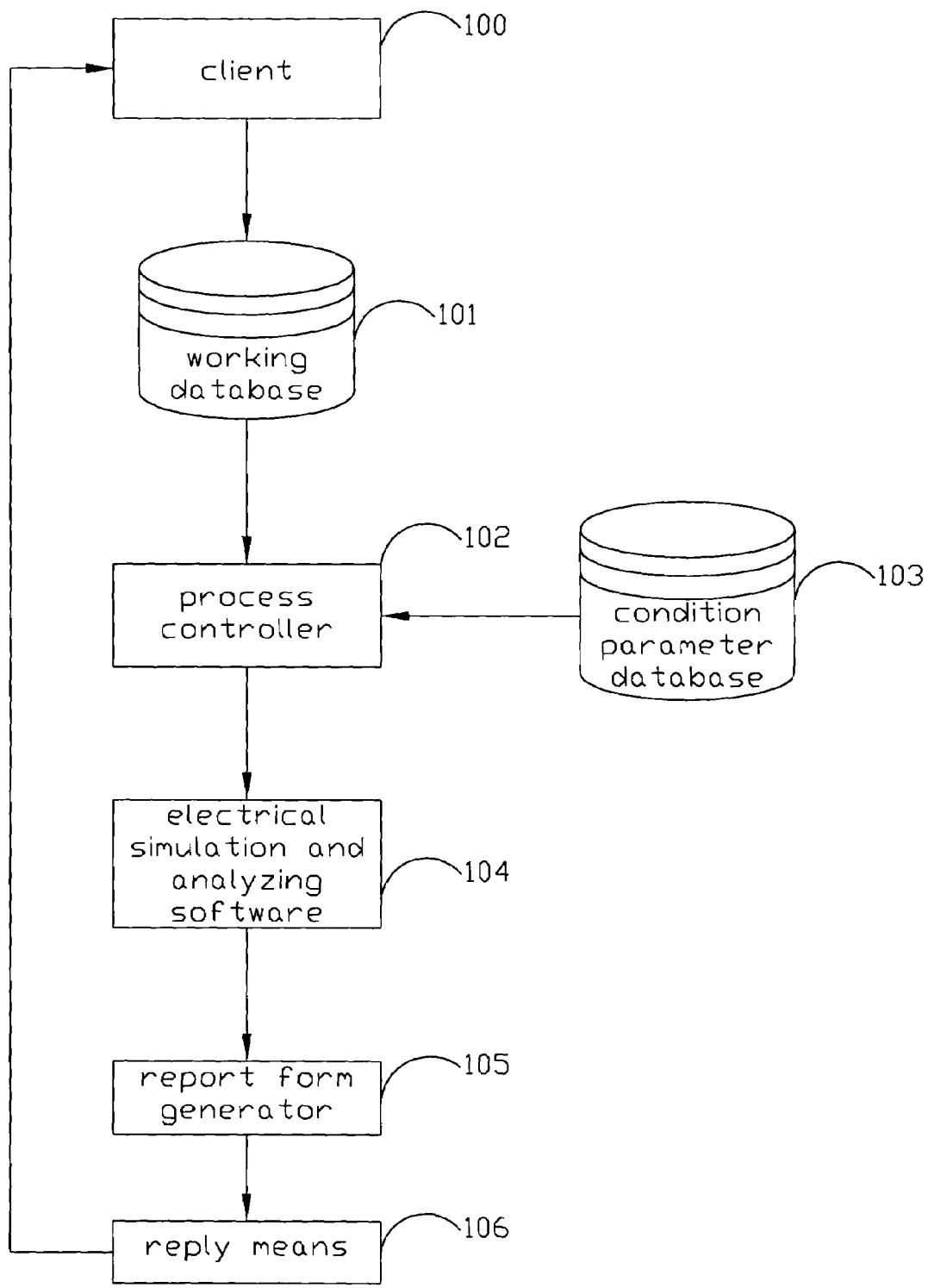
FIG. 1 is the block diagram of this invention.

FIG. 1 is the block diagram of this invention. Clients 100 use a web browser to input IC package parameters and transfer them to the working database 101 of this system through Internet. The input IC package parameters comprise the number of I/O terminals, package type, number of the substrate layer, substrate thickness, information about lead frame, and frequency. The system of this invention provides various IC package types, which comprise BGA (ball grid array), BCC, QFP, SOP, QFN (quad flat no-lead), Flip Chip, CSP (chip scale package), and WLCSP (wafer level chip scale package). When entrusting this system, the clients 100 would choose one of these IC package types.

The working database 101 stores the information about the IC package entrusted by the clients 100. A process controller 102 accesses the IC package parameters inputted by the clients 100 from the working database 101 and other needed condition parameters in accordance with the type of IC package entrusted by clients 100 from a condition parameter database 103. Because the number of IC package types depends on the content of the condition parameter database 103, the additions and deletions of the supported IC package types can be implemented by the modification of this database, even though the types available in this preferred example are BGA (ball grid array), BCC, QFP, SOP, QFN (quad flat no-lead), Flip Chip, CSP (chip scale package), and WLCSP (wafer level chip scale package). Hence, those who are familiar with ordinary skills of this field would appreciate the modification of the IC package types and other parameters provided by the system would not affect the spirit and scope of this invention.

The process controller 102 transfers the IC package parameters entrusted by clients 100 and the condition parameters accessed from the condition parameter database 103 to a built-in electrical simulation and analyzing software 104 for simulating and analyzing. The electrical simulation and analyzing software 104 would construct a three-dimensional model according to the data from process controller 102, and calculate the value of resistance (R), inductance (L), and capacitance (C).

In this preferred example, the formulas for the foregoing RLC values are described as follows:

$$R = \frac{1}{\sigma \pi \left(\frac{D}{2}\right)^2} (\Omega/\text{mm}),$$

$$Ls = \frac{\mu_0}{2\pi} \ln \frac{2H}{D} \ (\text{H/mm}),$$

$$Lm = \frac{\Phi_{12}}{I} \ (\text{H/mm}),$$

$C_L = C_S + C_m$ (F/mm), $$C_S = \frac{\pi \varepsilon_0}{\cosh^{-1}\left(\frac{2H}{D}\right)} \ (\text{F/mm}),$$

and $C_m = C_L - C_S$ (F/mm); wherein Ls is the self-inductance, Lm is the mutual inductance, $C_L$ is the load capacitance, $C_m$ is the mutual capacitance, D is the diameter, $\Phi_{12}$ is the magnetic flux, I is the electric current, $\sigma$ is the conductance coefficient, $\rho$ is the thermal resistance coefficient, $\mu_0$ is the induction coefficient, $\varepsilon_0$ is the dielectric coefficient, and $\pi$ is the ratio of the circumference to the diameter of a circle. The value of conductance coefficient, thermal resistance coefficient, induction coefficient, and the dielectric coefficient depend on the material of IC, and the ratio of the circumference to the diameter of a circle is a constant.

These obtained values are transferred to a report form generator 105, and the generator 105 would create a report form of result. This report form of result is transferred to a reply means 106, and the reply means 106 would send it to the clients 100 in e-mail through Internet. However, although the transmission way in this preferred example adopts e-mail, it is not a limitation, that is to say, other ways for communication, such as fax, can be included in the scope of this invention, too. Those who are familiar with ordinary skills of this field would appreciate the modification the transmission way would not affect the spirit and scope of this invention.

Figure 2:
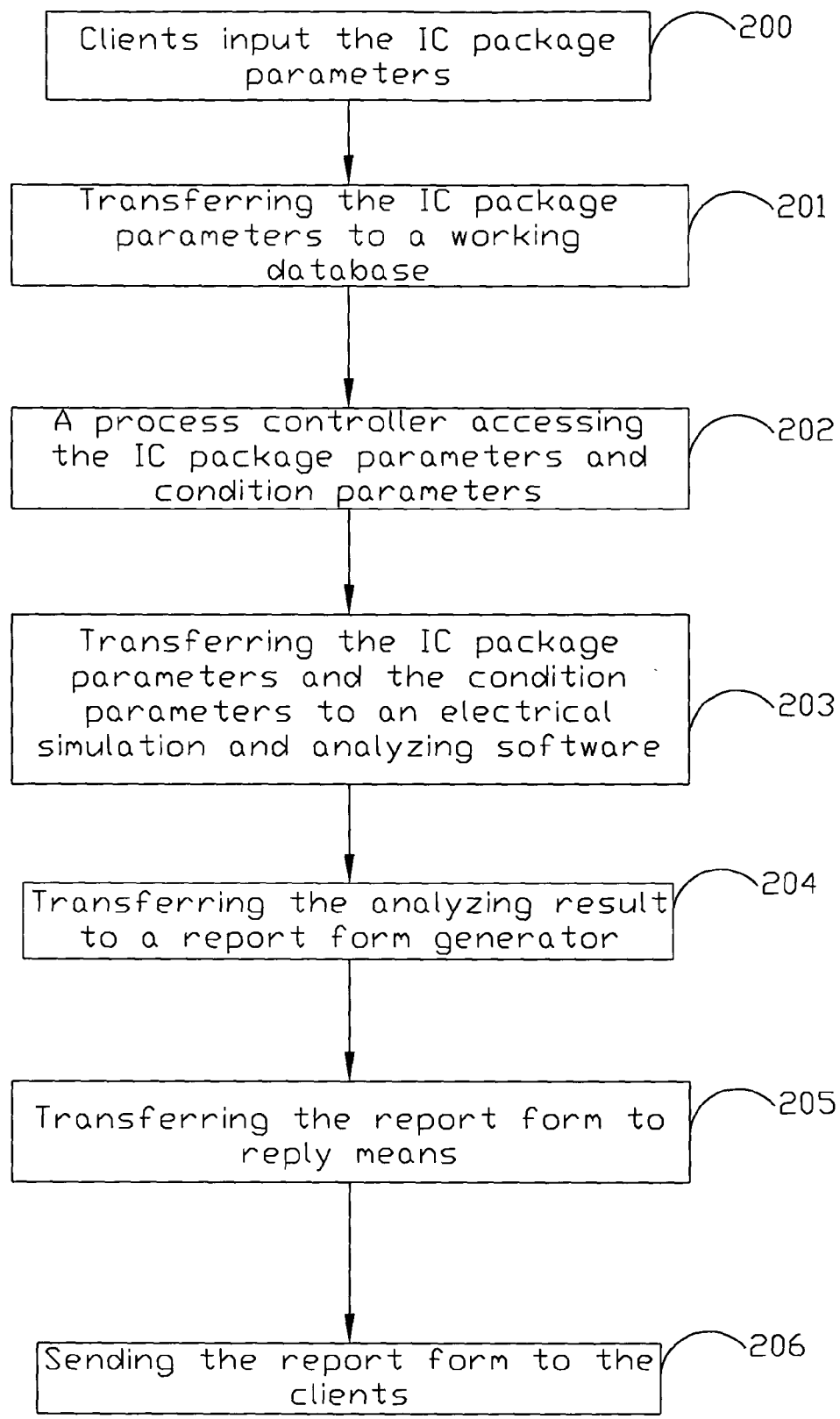
FIG. 2 is the flow chart of this invention.

FIG. 2 is the flow chart of the method of the present invention. Clients use a web browser to input the IC package parameters entrusted to be analyzed the electrical property (200). The input IC package parameters comprises the number of I/O (input and output) terminals, package type, number of the substrate layer, substrate thickness, information about lead frame, and frequency. The foregoing IC package parameters would be sent through Internet to the working database 101 of this system for storing (201). The process controller 102 accesses these IC package parameters from the working database 101 and other necessary condition parameters in accordance with the IC package type entrusted by clients from the condition parameter database 103 (202).

In this preferred example, the supported IC package types comprise BGA (ball grid array), BCC, QFP, SOP, QFN (quad flat no-lead), Flip Chip, CSP (chip scale package), and WLCSP (wafer level chip scale package). The function of the condition parameter database 103 is to store these necessary condition parameters of IC packages, and these condition parameters would be analyzed along with the parameters provided by clients. Those who are familiar with ordinary skills of this field would appreciate the additions and deletions of the IC package types supported by the system of this invention would not affect the spirit and scope of this invention. Hence, the enterprises can update the content of the condition parameter database 103 any time to meet the demand of industry, to follow the development of technology, and to reach the highest economical efficiency.

Sequentially, the process controller 102 transfers the IC package parameters from clients along with condition parameters from condition parameter database 103 to the built-in electrical simulation and analyzing software 104 of this system for simulating and analyzing (203). The electrical simulation and analyzing software 104 would construct a three-dimensional model according to the IC package parameters from clients and condition parameters from condition parameter database 103, and calculate the value of resistance (R), inductance (L), and capacitance (C).

The formulas for the foregoing RLC values in this preferred example are $$R = \frac{1}{\sigma \pi \left(\frac{D}{2}\right)^2} \, (\Omega/mm),$$

$$Ls = \frac{\mu_0}{2\pi} \ln \frac{2H}{D} \, (H/mm),$$

$$Lm = \frac{\Phi_{12}}{I} \, (H/mm),$$

$C_L = C_S + C_m$ (F/mm), $$C_S = \frac{\pi \varepsilon_0}{\cosh^{-1}\left(\frac{2H}{D}\right)} \, (F/mm),$$

and $C_m = C_L - C_S$ (F/mm).

When the calculation is finished, the result would be transferred to the report form generator 105 of this system. The report form generator 105 creates a report from of result according to the analyzed data (204). Thus report form of result is then transferred to the reply means 106 of this system (205), and the reply means 106 applies e-mail to send the report form of result to the clients immediately and automatically (206). The way to transfer report form of result in this preferred example adopts e-mail, but it is not a limitation, that is to say, other way for communication with the same effect, such as fax, can be included in this invention, too.

The foregoing steps are processed automatically by this system. From the clients inputting the order to receiving the report form of result, no employee is needed throughout the process. In this way, the speed to deal with the entrusting order would increase and the money for personnel can be saved, thus both the service providers and the users benefit from this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An Internet automatic electrical data system, comprising:
    a process controller configured to process an analyzing order for integrated circuit (IC) packages entrusted by clients;
    a working database coupled to said process controller, and used to store IC package parameters inputted by said clients;
    a condition parameter database coupled to said process controller to provide condition parameters relative to a model of the IC package entrusted by said clients;
    an electrical simulation and analyzing software used to analyze said IC package parameters inputted by said clients, and said condition parameters provided by said condition parameter database;
    a report form generator coupled to said electrical simulation and analyzing software to generate a report form of analyzed results; and
    replying means coupled to said report form generator to send said report form to said clients.

2. The system of claim 1, wherein said clients transmit said IC package parameters through the Internet.

3. The system of claim 1, wherein said replying means sends said report form to said clients utilizing at least one of electronic mail and facsimile.

4. The system of claim 1, wherein said process controller accesses said condition parameters from said condition parameter database, and then transfers said condition parameters along with said IC package parameters inputted by said clients to said electrical simulation and analyzing software.

5. The system of claim 1, wherein the IC package types provided by said condition parameter database comprise BGA (ball grid array), BCC, QFP, SOP, QFN (quad flat no-lead), Flip Chip, CSP (chip scale package), and WLCSP (wafer level chip scale package).

6. The system of claim 1, wherein said IC package parameters inputted by said clients comprise the number of I/O (input and output) terminals, package type, substrate layer, substrate thickness, information about lead frame, and frequency.

7. The system of claim 1, wherein said electrical simulation and analyzing software constructs a three-dimensional model according to said IC package parameters and said condition parameters.

8. The system of claim 7, wherein said electrical simulation and analyzing software calculates the resistance, inductance and capacitance of said IC package according to said IC package parameters and said condition parameters.

9. The system of claim 1, wherein said electrical simulation and analyzing software transfers said analyzed results to said report form generator.

10. A method for automatically analyzing electrical data through the Internet, comprising the following steps:
    inputting IC package parameters for analyzing by a client;
    transferring said IC package parameters to a working database for storing through the Internet;
    accessing said IC package parameters from said working database and condition parameters relative to said IC package parameters from a condition parameter database by a process controller,
    transferring said IC package parameters and said condition parameters to an electrical simulation and analyzing software for simulating and analyzing by said process controller to generate an analyzed result;
    transferring the analyzed result to a report form generator for generating a report form of analyzed result;
    transferring said report form via said report form generator to a replying means; and sending said report form to said client by said replying means.

11. The method of claim 10, wherein said client transmits said IC package parameters through the Internet.

12. The method of claim 10, wherein said IC package parameters inputted by said client comprises the number of I/O terminals, package type, the number of the substrate layer, substrate thickness, information about lead frame, and frequency.

13. The method of claim 10, wherein said electrical simulation and analyzing software constructs a three-dimensional model according to said IC package parameters and said condition parameters.

14. The method of claim 13, wherein said electrical simulation and analyzing software calculates the resistance, inductance, and capacitance of said IC package according to said IC package parameters and said condition parameters.

15. The method of claim 10, wherein the IC package types provided by said condition parameter database comprise BGA (ball grid array), BCC, QFIP, SOP, QFN (quad flat no-lead), Flip Chip, CSP (chip scale package), and WLCSP (wafer level chip scale package).

* * * * *